J. J. POWER.
CORN HUSKING MACHINE.
APPLICATION FILED MAR. 3, 1902. RENEWED SEPT. 7, 1907.
1,133,817.
Patented Mar. 30, 1915.
2 SHEETS—SHEET 1.
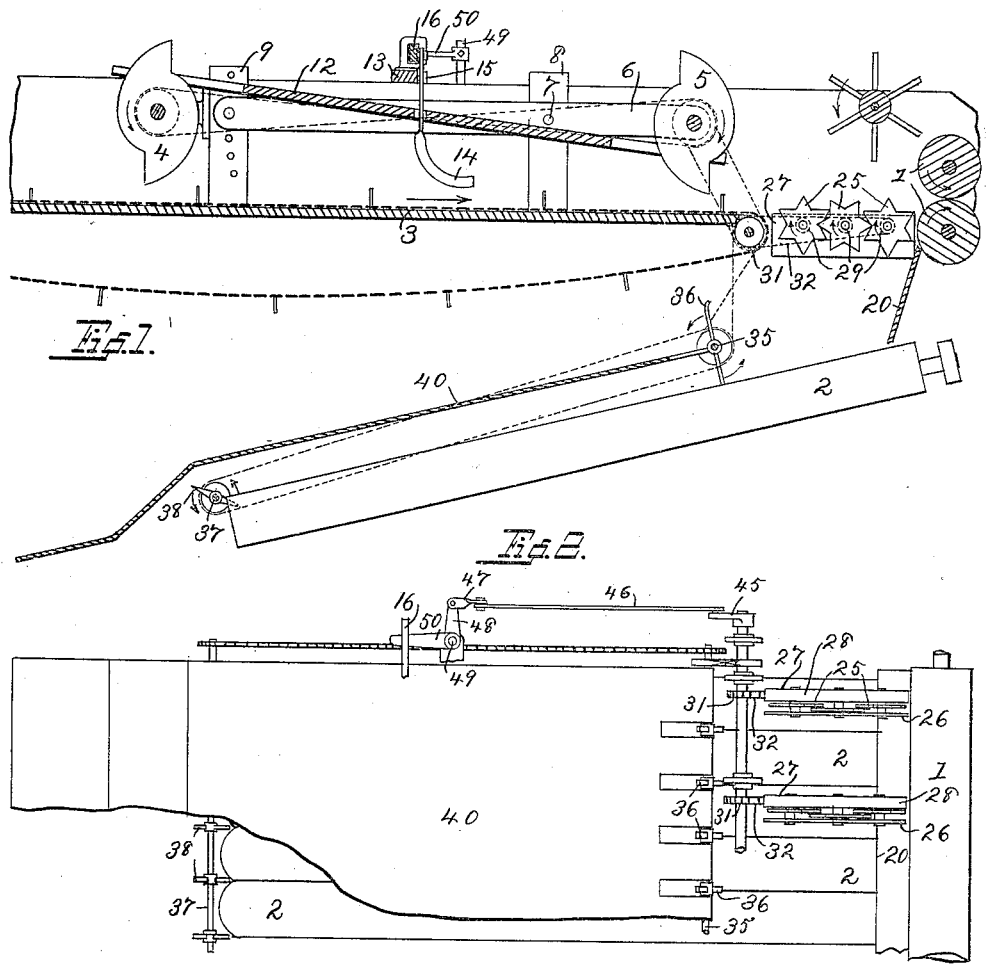
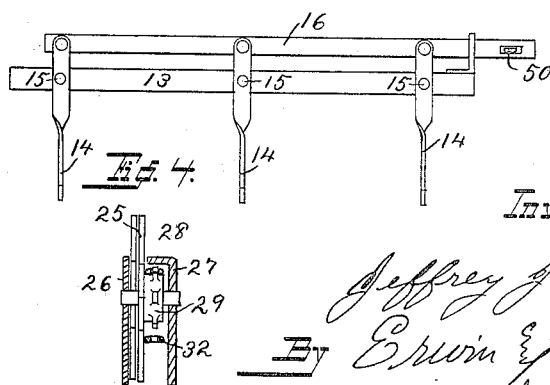

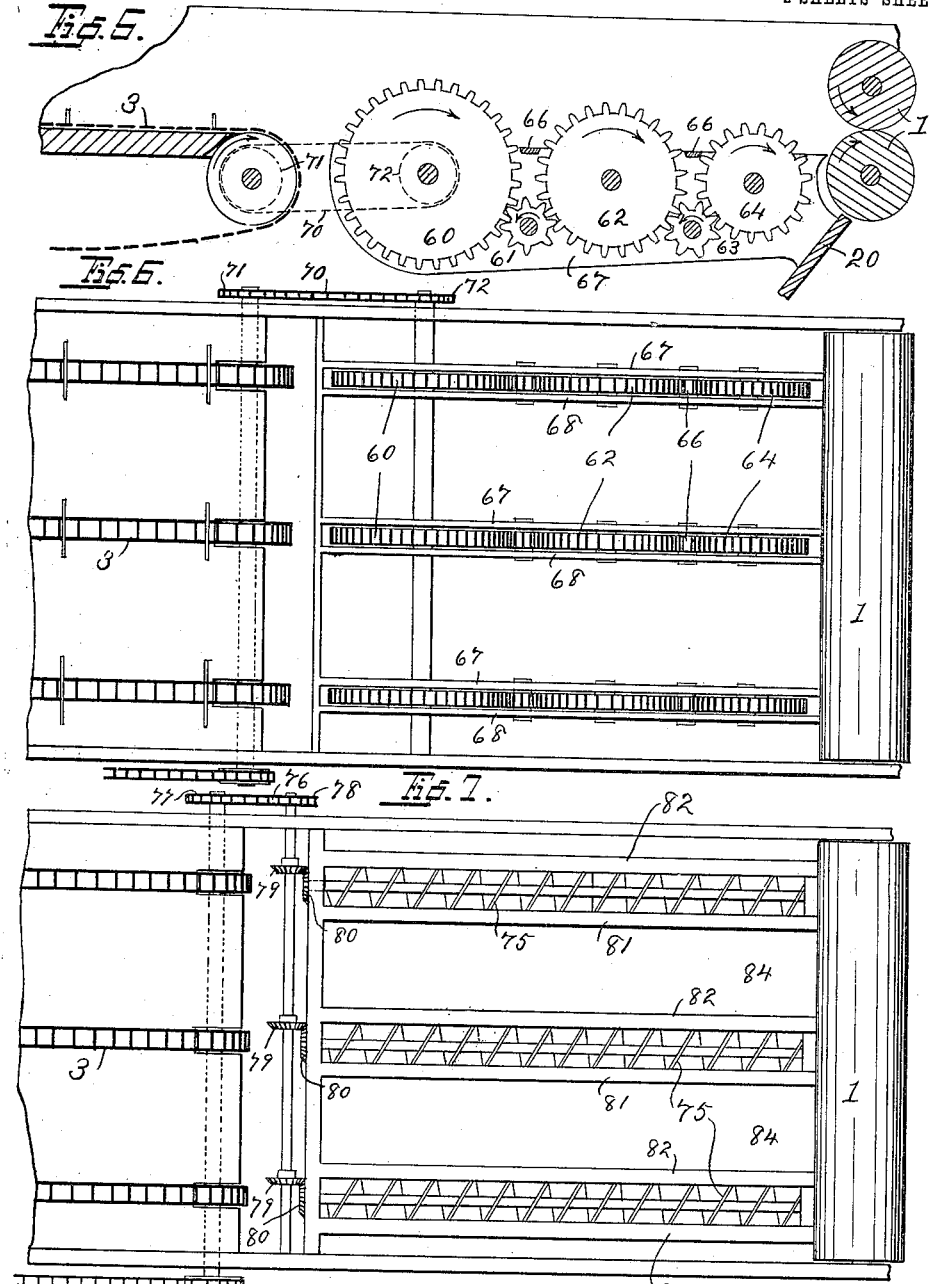

UNITED STATES PATENT OFFICE.

JEFFREY J. POWER, OF MADISON, WISCONSIN, ASSIGNOR TO J. I. CASE THRESHING MACHINE COMPANY, OF RACINE, WISCONSIN, A CORPORATION.

CORN-HUSKING MACHINE.

1,133,817.      Specification of Letters Patent.      Patented Mar. 30, 1915.

Application filed March 3, 1902, Serial No. 96,538. Renewed September 7, 1907. Serial No. 391,882.

*To all whom it may concern:*

Be it known that I, JEFFREY J. POWER, citizen of the United States, residing at Madison, county of Dane, and State of Wisconsin, have invented new and useful Improvements in Corn-Husking Machines, of which the following is a specification.

My invention relates to improvements in corn husking machines.

The objects of my invention are,—1st, to provide means for thoroughly separating the stalks upon a feeding device or conveyer, and deliver them from the conveyer across the ear-receiving throat of the husking rollers to the snapping rollers, without permitting the stalks to drop through the throat; 2nd, to provide means for preventing the ears from accumulating in bunches upon the husking rollers, and for distributing the ears upon such rollers and arranging them longitudinally thereon.

In this connection, my invention also contemplates the provision of a guard or shield, covering the lower portion of the husking rollers, and the provision of pickers coöperating with the ear-distributing mechanism to prevent clogging upon such rollers, or upon the guard.

In the following description, reference is had to the accompanying drawings, in which—

Figure 1 is a longitudinal sectional view of the corn husking machine, embodying my invention; Fig. 2 is a partial top view of the snapping rollers, the stalk-advancing device bridging the ear-receiving throat, the husking rollers with the ear-distributing devices, and pickers arranged in operative relation thereto. Fig. 3 is a detail rear view of the stalk-distributing or bundle-separating arms and actuating mechanism; Fig. 4 is a cross sectional view of one of the sets of stalk-advancing devices, bridging the ear-receiving throat of the husking rollers. Fig. 5 is a sectional view, showing a modified form of mechanism for bridging the ear-receiving throat; Fig. 6 is a top view of the same; Fig. 7 is a top view of another modified design for the same purpose; and Fig. 8 is a cross sectional view of one of the screw conveyers, and its housing, shown in Fig. 7.

Like parts are identified by the same reference characters throughout the several views.

In the drawings, 1 are the snapping rollers; 2 the husking rollers; 3 a conveyer, of ordinary construction, for the bundles of corn stalks; 4 are band-cutting knives, also of ordinary construction. These knives move through the bundles in the direction in which they are carried by the conveyer. A second set of knives 5 are supported near the rear end of the conveyer by a knife-supporting frame 6, pivotally mounted at 7 upon supporting posts 8, the frame being also adjustably secured to posts 9 at its front end. By lowering the frame on the posts 9, the knives 5 may be brought into greater or less proximity with the conveyer 3, according to the character of the material. The knives 5 are revolved in a direction opposite that of the knives 4, and serve not only to effectually sever all uncut bands, but also serve as a detainer to prevent undistributed bundles from passing to the snapping rollers. An inclined platform 12 is secured to the posts 8 and 9, and is slotted for the reception of the knives 4 and 5 respectively. A block 13 is secured to the platform 12, and stalk-distributing fingers 14 are pivotally secured to the block at points 15 thereon, and are connected with a transversely reciprocating rod or shaker 16, whereby the fingers 14 are made to oscillate transversely of the conveyer. The fingers are preferably formed of flat strips or bars, the lower ends of which are turned edge-wise to the stalks, as shown, and bent rearwardly so that they will not catch or tangle in the stalks. The rod 16 may be reciprocated by any mechanism suitable for that purpose.

20 is a chute extending from the snapping rollers into close proximity with the husking rollers, and forming a throat for the downward passage of ears of corn between said chute and the rear or discharge end of the conveyer 3. To prevent any transversely disposed stalks from dropping to the husking rollers through this throat, I have provided a plurality of sets of toothed stalk-advancing disks or plates 25, each set being arranged to extend across the throat in the line of stalk movement, with intervening spaces through which the ears drop to the husking rollers. The plates 25 are journaled and partially housed between the bars 26 and 27, the bars 27 being of angle iron, with a flange 28 projecting into close proximity with one side of the toothed plates 25, and the bar 26 being located in close proximity to the other side thereof, as shown in Fig. 4, sprockets 29 being located on the axles of the plates 25, in a position to be covered by the flange 28 of the bar 27. The teeth of the plates 25 project upward from between the bars 25 and 27, sufficiently to engage the stalks and force them forwardly to the husking rollers, and the bars are also so located that the upper surfaces of the sprocket pinions 29 will be in substantially the same plane as the upper surface of the sprocket wheel 31, at the rear end of the conveyer 3. A sprocket chain 32 is used to drive the sprocket pinions 29 from the sprocket-wheel 31, the wheel 29 being preferably of smaller diameter than the wheel 31, whereby the former are driven at higher speed than the latter.

Immediately in advance of the ear-receiving throat, and underneath the conveyer 3, is a transverse shaft 35 provided with ear-distributing fingers 36, the shaft being revolved so as to move the fingers in opposition to the ears, and the ends of the fingers being slightly curved backwardly to prevent them from catching in the husks. The fingers 36 are located to revolve in planes substantially in the axial line of the husking rollers, so that the ears are caused to assume positions in the grooves or channels formed between the adjacent rollers, the fingers also serving to arrange the ears longitudinally upon the rollers and prevent them from bunching thereon. At the lower end of the rollers another shaft 37 is located, this shaft being provided with short teeth or pickers 38, which are revolved so as to lift the husks from the lower ends of the rollers, which would otherwise tend to accumulate at this point. By the use of the fingers 36 and the pickers 38, I am enabled to so effectually prevent the clogging of the husking rollers as to make it practicable to use a housing 40, which incloses the husking rollers from their lower ends to a point in close proximity to the fingers 36, all necessity of pulling out clogs when the machine is in operation being avoided, as well as all danger of injury arising from persons accidentally coming in contact with, and being caught by, the husking rollers.

It will be observed that the plates 25 are arranged to partially over-lap each other, the plates of each set being thus adapted to furnish a continuous support for the stalks. It will, of course, be understood that one set of plates does not of itself support the stalks, but coöperates with the adjacent set to support any stalks which may be transversely disposed, while the stalks that are longitudinally disposed upon the conveyer, will project across the ear-receiving throat and be received by the snapping rollers independently of the action of the plates 25.

Referring to the construction shown in Figs. 5 and 6, it will be observed that the stalk advancing mechanism consists merely in a train of gears 60, 61, 62, 63, and 64, respectively, motion being communicated to the gear wheel 60 from the conveyer by means of a sprocket chain 70, sprocket wheels 71 and 72 respectively. The gear wheels 60, 62 and 64 are used for advancing the stalks, as well as for transmitting motion, while the gear wheels 61 and 63 are used merely for transmitting motion. Cross bars 66 are preferably used to keep out the litter from between the gear teeth. It will be observed that the gear wheels 60, 62 and 64 decrease in size successively, thus increasing the motion of the stalks as they advance, and tending to separate and draw them out longitudinally. In the drawings, the supporting shafts or trunnions of these gear wheels are shown as located in a horizontal plane, but, if desired, they may be so located as to bring the upper surfaces of the gear wheels into a horizontal plane, or into a plane continuous with that of the conveyer. The gears are partially inclosed at the sides by supporting bars or housings 67 and 68.

In Fig. 7, I have illustrated a form of construction in which the rotary stalk-advancing devices consist of a series of screw-conveyers 75, driven from the main conveyer by the sprocket chain 76, sprocket wheels 77 and 78, respectively, and beveled gears 79 and 80. The screws are partially inclosed by housings 81 and 82. In this construction the rotary blades of the screw-conveyers throw off any ears of corn that may drop thereon, thus causing the ears to drop through the intervening spaces 84. These devices may, therefore, be made wider than the stalk-advancing mechanism shown in the other views.

Suitable driving connections for the various parts herein described are illustrated in the drawings, but need not be mentioned specifically, the means for driving the various parts of corn husking machines being well understood in the art, and requiring no detailed description.

Having thus described my invention, what I claim as new and desire to secure by Letters Patent is,—

1. In a machine of the described class, the combination with husking and snapping rollers; of a stalk conveyer arranged with an ear-receiving throat between it and the snapping rollers; bars extending across said throat; and sets of rotary stalk-advancing devices journaled to said bars,—said stalk-advancing devices and supporting bars being of less width than the length of an ear of corn, and said bars being sufficiently separated to permit the detached ears to drop to the husking rollers.

2. In a machine of the described class, the combination with husking and snapping rollers in operative relation; of stalk-advancing mechanism arranged to deliver stalks to the snapping rollers, and comprising a plurality of sets of rotary plates, each plate having stalk-engaging projections,—said sets of plates being arranged with intervening spaces adapted to permit the downward passage of ears of corn to the husking rollers.

3. In a machine of the described class, the combination with husking and snapping rollers in operative relation; of stalk-advancing rotary plates, arranged in sets, and provided with stalk-engaging projections; and means for independently driving the plates of each set,—said sets being arranged with intervening spaces adapted to permit the downward passage of ears of corn, and the plates being formed to direct the ears into such spaces.

4. In a machine of the described class, the combination with husking and snapping rollers in operative relation; of stalk-advancing rotary plates, arranged in sets of partially overlapping plates, and provided with stalk-engaging projections; and means for independently driving the plates of each set,—said sets being arranged with intervening spaces adapted to permit the downward passage of ears of corn, and the plates being formed to direct the ears into such spaces.

5. In a machine of the described class, the combination with the husking and snapping rollers in operative relation; of sets of rotary stalk-advancing devices; driving connections for the stalk-advancing devices of each set; and supporting side bars covering said driving connections, and all but the upper portions of the advancing devices,—said devices and supports being arranged in sets with intervening spaces between the sets.

6. In a machine of the described class, the combination with snapping and husking rollers in operative combination; of a stalk-conveyer; a transversely disposed set of rotary band-cutting blades; a second set of similar rotary blades faced in the opposite direction from those of the first mentioned set; and means for revolving said blades in a direction opposite the motion of those of the first mentioned sets.

7. In a machine of the described class, the combination with snapping and husking rollers in operative combination, of a stalk conveyer; a transversely disposed set of rotary band cutting blades; means for rotating said blades through the stalks on the conveyer in the direction of conveyer movement; a second set of similar rotating blades faced in the opposite direction; and means for revolving said blades through the stalks on the conveyer in a direction opposite that of conveyer movement.

8. In a machine of the described class, the combination with snapping and husking rollers in operative relation to a stalk conveyer provided with stalk advancing projections; a transversely disposed set of rotary band-cutting blades operative upon the stalks in the direction of stalk advancement; a second set of similar blades, and means for revolving them in the opposite direction; and an inclined platform, located between the sets of blades and having a downward pitch in the direction of the second set.

9. In a machine of the described class, the combination with snapping and husking rollers in operative relation to a stalk conveyer provided with stalk advancing projections; a transversely disposed set of rotary band-cutting blades, operative upon the stalks in the direction of stalk advancement; a second set of similar blades, and means for revolving them in the opposite direction; and an inclined platform, located between the sets of blades and having a downward pitch in the direction of the second set; said platform being arranged to project between the blades of each set.

10. In a machine of the described class, the combination with snapping and husking rollers in operative relation to a stalk conveyer; a set of rotary band-cutting blades, operative upon the stalks in the direction of their advancement; a second set of similar blades and means for revolving them in the opposite direction; stalk advancing projections on the conveyer; and means for preventing the blades from lifting the stalks from the conveyer.

11. In a machine of the described class, the combination with husking rollers; of a transversely arranged set of revolving fingers operating in proximity to the husking rollers near the receiving end thereof; together with a set of revolving pickers operating in the angles of the rollers at their discharge end; and a guard or shield covering the rollers between the fingers and pickers.

12. In a machine of the described class, the combination with husking rollers; of a transversely arranged set of revolving pickers operating in the angles between the rollers at their discharge end,—said pickers being arranged to move upwardly in such angles.

13. In a feeder for corn huskers, the combination with the frame having a throat therein, a movable clearing cutter for said throat, and means extending across said throat for forwarding the stalks, said means having openings between them for the ears to pass through.

14. In a feeder for corn-huskers, the combination with the snapping rolls, of a rotary forwarding and clearing cutter, and means between said rolls and cutter for supporting and forwarding the stalks having openings between them for the ears to pass through.

15. In a feeder for corn-huskers, the combination with the snapping rolls, of a main feeding mechanism having a movable clearing cutter at the rear thereof and auxiliary stalk-forwarding and separate stalk supporting devices located between said rolls and said feeding mechanism provided with openings between them for the ears to pass through.

16. In a band cutter and feeder for corn-huskers, the combination with the snapping rolls, of a rotary band-cutter, a movable clearing cutter and stalk supporting and separate forwarding devices beyond having openings between them for the ears to pass through.

17. In a feeder for corn-huskers, the combination with the snapping rolls, of a main feeding mechanism having a movable clearing cutter, a retarding device located above said mechanism and an auxiliary forwarder located between said snapping rolls and said main feeding mechanism.

18. In a feeder for corn huskers, the combination with the snapping rolls, of a movable reverse clearing cutter at the entrance thereof and intermittent means between said rolls and cutter for advancing the stalks while permitting the ears to pass through.

19. In a corn husking machine, the combination with snapping and husking rolls, of a conveyer arranged with an ear receiving throat between it and the snapping rolls, and stalk advancing devices at the throat between said conveyer and said snapping rolls, said devices being spaced apart to permit the detached ears to drop between them onto the husking rolls and the upper operating portions of said stalk advancing devices being arranged to rotate continuously in the same direction.

20. In a corn husking machine, the combination with snapping and husking rolls, of a conveyer arranged with an ear receiving throat between it and the snapping rolls, a series of bars extending across the throat between said conveyer and said snapping rolls, and stalk advancing devices arranged adjacent said bars and having working portions projecting above the same and arranged to rotate continuously in the same direction, said bars and said stalk advancing devices being spaced apart to permit the detached ears to drop between them onto the husking rolls.

21. In a corn husking machine, the combination with snapping and husking rolls, of a conveyer arranged with an ear receiving throat between it and the snapping rolls and rotary stalk advancing devices at the throat between said conveyer and said snapping rolls, said rotary devices having upper working portions arranged to travel continuously in the same direction, said rotary stalk advancing devices being spaced apart to permit the detached ears to drop between them onto the husking rolls.

22. In a corn husking machine, the combination with snapping and husking rolls, of a conveyer arranged with an ear receiving throat between it and the snapping rolls, a series of bars extending across the throat between said conveyer and said snapping rolls, sets of rotary stalk advancing devices mounted on said bars and having working portions projecting above the same, and arranged to rotate continuously in the same direction, said bars and stalk advancing devices being spaced apart to permit the detached ears to drop between them onto the husking rolls and means for driving said separate sets of stalk advancing devices.

23. In a corn husking machine, the combination with snapping and husking rolls, of a conveyer arranged with an ear receiving throat between it and the snapping rolls, pairs of bridge bars extending across the throat in the plane of said conveyer and said snapping rolls and stalk advancing devices arranged and moving between each pair of bars, said stalk advancing devices having working portions projecting above said bars, the bars of each pair being arranged closely adjacent said stalk-advancing devices and the separate pairs of bars being spaced apart to permit the detached ears to drop between them onto the husking rolls.

24. In a corn husking machine, the combination with snapping and husking rolls, of a conveyer arranged with an ear receiving throat between it and the snapping rolls, pairs of parallel bars extending across the throat between said conveyer and said snapping rolls, sets of rotary, toothed stalk advancing plates mounted between said pairs of bars and having working portions projecting above the same and means for driving said sets of plates.

25. In a corn husking machine, the combination with snapping and husking rolls, of a conveyer arranged with an ear receiving throat between it and the snapping rolls, a series of bars extending across the throat between said conveyer and said snapping rolls, sets of rotary, overlapping, toothed plates mounted on said bars and having working portions projecting above the same for advancing the bars across the throat, said bars and said sets of stalk advancing plates being spaced apart to permit the detached ears to drop between them onto the husking rolls and means for driving said sets of plates.

26. In a corn husking machine, the combination with the conveyer and with the snapping rolls located at a distance behind the conveyer to afford an open throat between, of the husking rolls arranged beneath to receive the detached ears falling through said throat, the bridge bars extended at intervals, across the throat at the level of the conveyer and the snapping rolls to sustain the traveling stalks and the feed advancing devices therefor projected above the plane of the sustaining bars, but movably coöperating therewith to progressively advance the stalks across the throat from the conveyer to the snapping rolls, substantially as described.

In testimony whereof I affix my signature in the presence of two witnesses.

JEFFREY J. POWER.

Witnesses:
  H. C. WINTER,
  FLORENCE TURNERUSE.

Copies of this patent may be obtained for five cents each, by addressing the "Commissioner of Patents, Washington, D. C."